United States Patent [19]

Masini

[11] Patent Number: 5,028,203
[45] Date of Patent: Jul. 2, 1991

[54] ARRANGEMENT FOR LEADING BUNDLES OF SHEETS IN DIFFERENT ORIENTATIONS ON A PALLET

[75] Inventor: Giancarlo Masini, Galliate, Italy

[73] Assignee: Civiemme S.r.l, Italy

[21] Appl. No.: 253,253

[22] Filed: Oct. 4, 1988

[30] Foreign Application Priority Data

Oct. 8, 1987 [IT] Italy ................ 22180 A/87

[51] Int. Cl.⁵ .......................................... B65G 57/08
[52] U.S. Cl. ...................... 414/792.9; 414/751; 414/763; 901/12; 901/49; 294/119.1; 294/902
[58] Field of Search ............ 414/792.9, 793, 792, 414/751, 752, 763; 901/17, 31, 32, 33, 36, 38, 12, 13, 49; 294/115, 907, 119.1, 86.41

[56] References Cited

U.S. PATENT DOCUMENTS

| | | | |
|---|---|---|---|
| 2,959,445 | 11/1960 | Breslov | 294/119.1 |
| 3,199,910 | 8/1965 | Bradley | 294/119.1 |
| 3,905,632 | 9/1975 | Caylor et al. | 294/119.1 |
| 4,256,429 | 3/1981 | Dwyer | 414/763 X |
| 4,509,891 | 9/1985 | Lipscomb | 414/795.7 |
| 4,547,121 | 10/1985 | Nesmith | 901/31 X |
| 4,648,233 | 3/1987 | Holland | 414/792.9 X |
| 4,750,132 | 6/1988 | Pessina et al. | 414/751 X |
| 4,772,170 | 9/1988 | Oldfield | 414/792.9 |
| 4,925,360 | 5/1990 | Kato | 901/49 X |

FOREIGN PATENT DOCUMENTS

| | | | |
|---|---|---|---|
| 233232 | 10/1959 | Australia | 294/119.1 |
| 36989 | 6/1965 | German Democratic Rep. | 414/795.7 |
| 0021604 | 9/1965 | Japan | 414/792.9 |
| 0155126 | 7/1986 | Japan | 414/792.9 |
| 0291322 | 12/1986 | Japan | 414/792.9 |
| 0034817 | 2/1989 | Japan | 414/792.9 |
| 2190653 | 11/1987 | United Kingdom | 414/792.9 |

Primary Examiner—Robert P. Olszewski
Assistant Examiner—Boris Milef
Attorney, Agent, or Firm—Kirschstein, Ottinger, Israel & Schiffmiller

[57] ABSTRACT

An arrangement for loading elongated bundles of sheets on a pallet in different orientations includes conveying a movable carriage between a supply station to which bundles are fed, and a loading station at which bundles are loaded on the pallet. An upright column extending along a longitudinal axis is mounted on, and is jointly movable with, the carriage. A pair of jaws is displaceable toward and away from each other along a transverse axis. In a bundle-gripping position, the jaws engage opposite ends of a bundle. In a bundle-release position, the jaws are disengaged from the bundle. The jaws are raised and lowered along the longitudinal axis. The jaws, while in the bundle-gripping position, are turned about, and in a plane perpendicular to, the longitudinal axis to a desired angular orientation prior to loading the bundle onto the pallet.

11 Claims, 5 Drawing Sheets

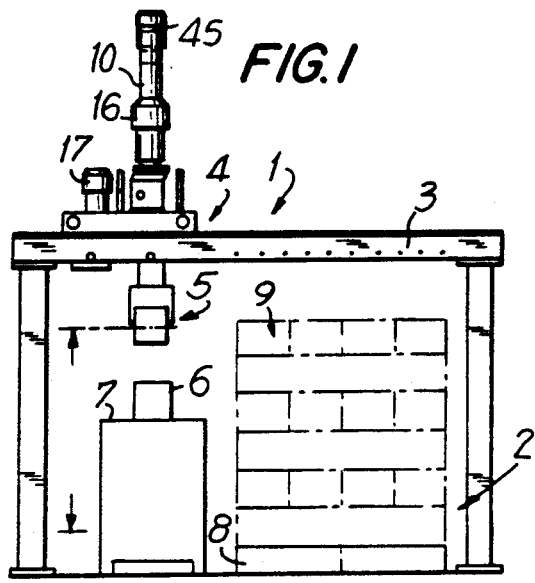
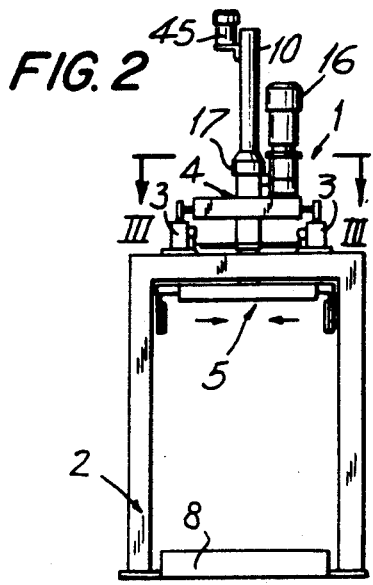
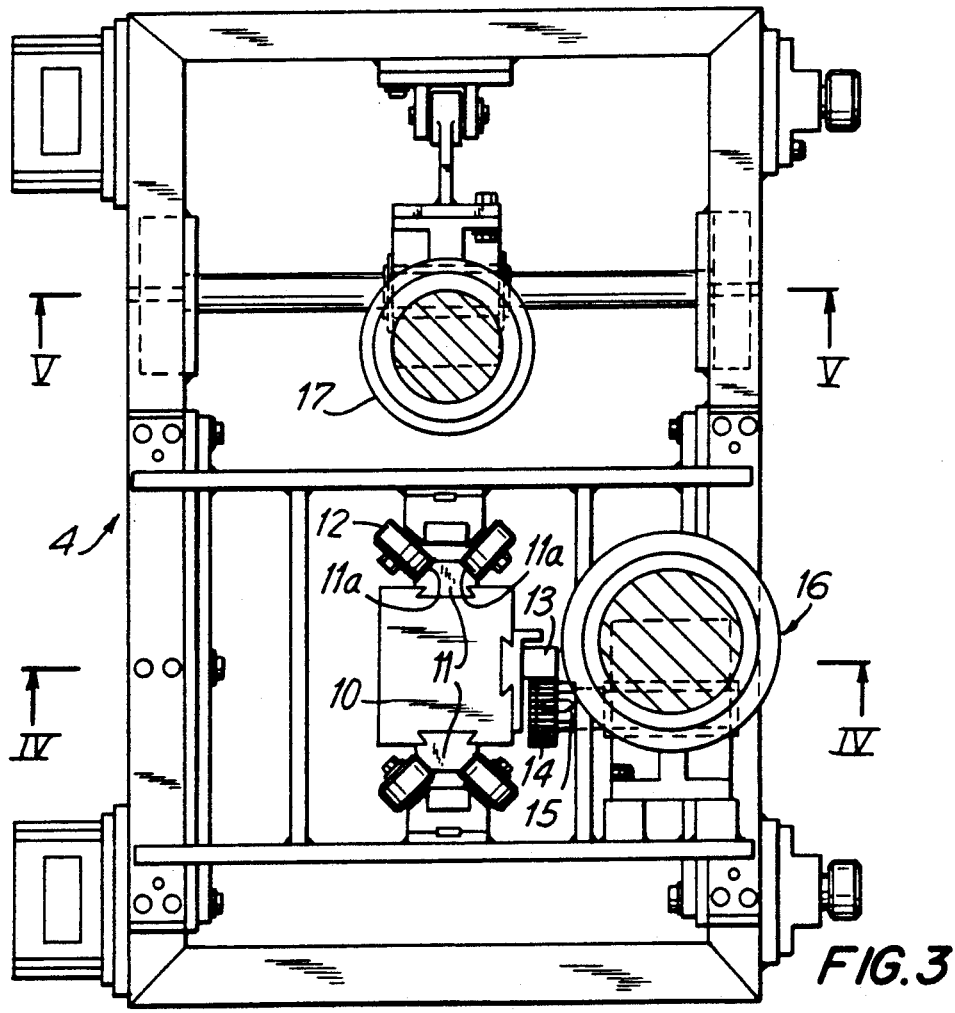

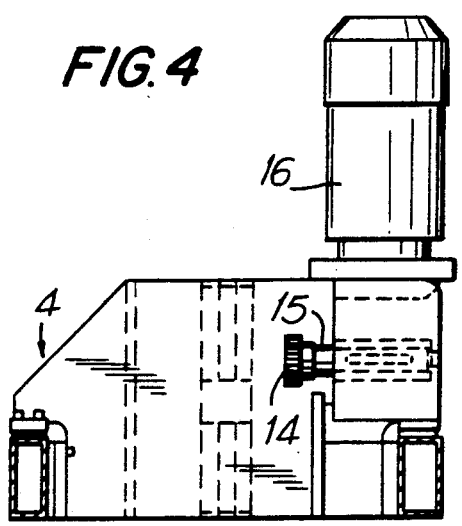
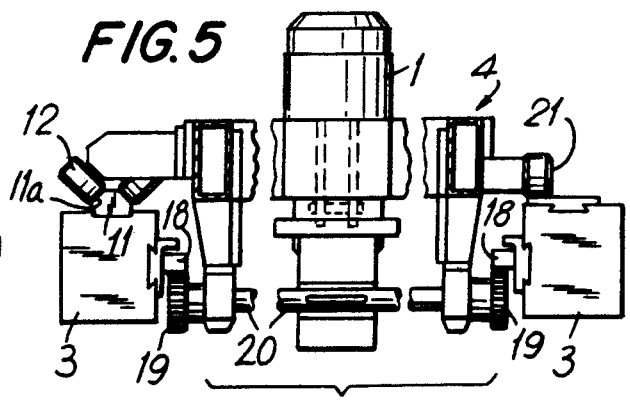
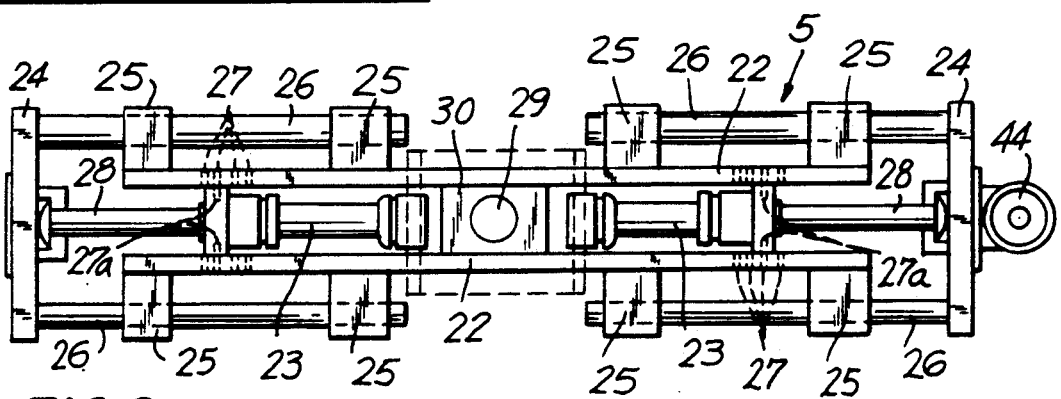
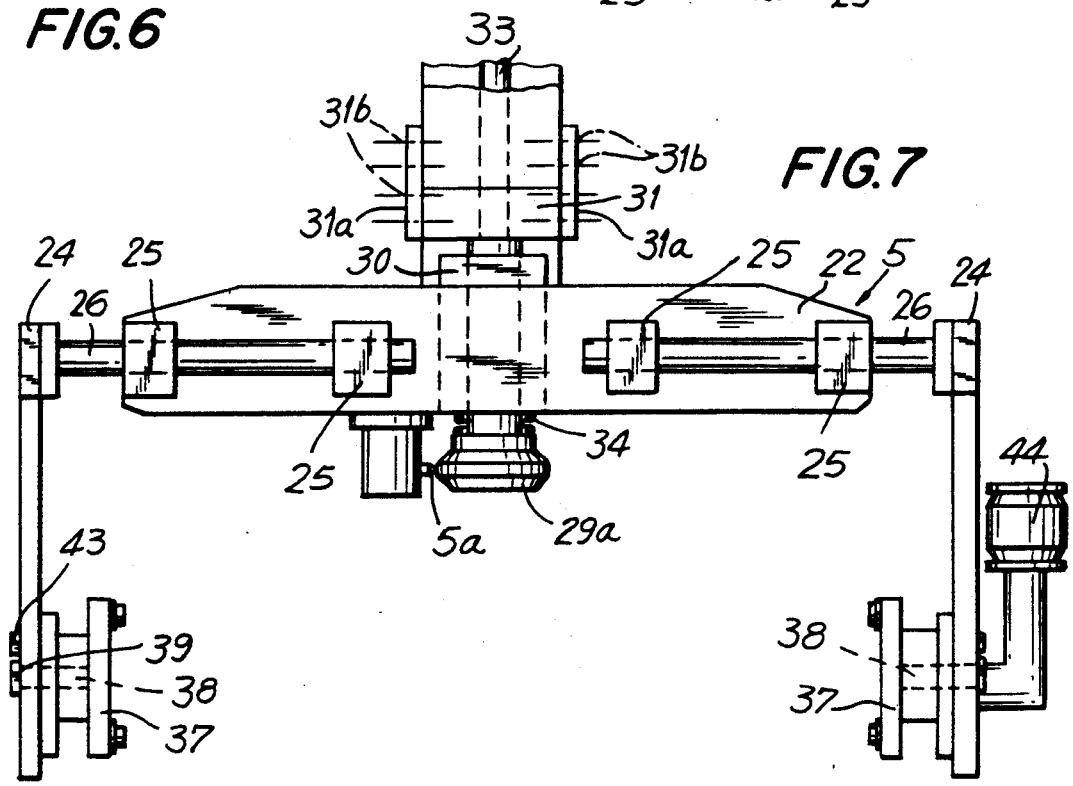

ARRANGEMENT FOR LEADING BUNDLES OF SHEETS IN DIFFERENT ORIENTATIONS ON A PALLET

BACKGROUND OF THE INVENTION

1. Field of the Invention

The present invention concerns a jaw palletizer for the graphics industry.

2. Description of Related Art

In the graphics industry, the sheets coming off the rotary press are fed in the form of a stream of sheets overlapping like scales into a stacker, where up to a pre-set number of sheets are assembled in superposed layers to form a bundle. This can, for example, be between 80 and 120 cm in height. The bundle is then conveyed on roller tables to a binding station, from where it is transported onto a pallet for the sheets to be given further handling elsewhere.

Jaw palletizers are known for conveying bundles onto pallets which comprise a jaw with movable cheeks supported by a winch housed on a trolley moving along overhead rails, the jaw being additionally equipped with guide elements in the form of movable vertical rods in guides interposed between said trolley and its axles, which support the wheels moving along the overhead rails. This design type is to be found in British patent no. 2,119,340 in which one of the cheeks of the jaw is a fixed part of its structure, whilst the other is attached to the moving part of a cylinder/piston unit to enable bundles of varying lengths to be gripped. With palletizers of this type, however, the support given to the bundle is unbalanced, with the result that the guide rods are subjected to notable stresses and strains. These rods can be of considerable lengths, since they must be able to form on the pallet a pile of different superposed layers of bundles and, furthermore, the overhead rails need to be positioned at a certain height so as not to obstruct the free passage of people, fork-lift trucks and other vehicles. It must also be pointed out that jaws of this type, with the addition of the bundle being carried, often make for a notable weight, in the region of 150 kg, for example. This type of design can accordingly cause the bundle to oscillate during con veyance. To avoid this oscillation, which could seriously affect the formation of a compact pile on the pallet, the bundle would have to be transported at low speed. Another disadvantageous feature of the palletizer disclosed in the British patent 2,119,340 is that the bundles, after being picked up, have to be transported in the same position as that in which they were collected. To permit conveyance of bundles that are of a fair height, jaws of this type employ cylinder/piston units of considerable length. Apart from having unfavorable repercussions so far as the balance of the combined jaw/bundle unit is concerned, this also has a negative effect on production costs, since such lengthy cylinder/piston units are very expensive. They also, in proportion with the length of the respective bundle, occupy a good deal of space. U.S. Pat. No. 4,256,429 discloses a jaw for conveying sheet bundles that is of the same type as the one described above, but provision is made for it to be used suspended by means of a chain with a conveyor device. Provision is also made, with this type of jaw, for the bundle gripped between the cheeks to be rotated lengthwise. For this purpose, rotatable, disc-shaped supports are attached to the cheeks, one of them being connected by chain transmission to a motor mounted on the top of the transverse part of the jaw. The said transverse part is also provided with a vertical cylinder/piston unit with a catch projection for ensuring that the bundle is supported at the correct height level, to allow enough room for it to rotate freely. This device however, in which a cylinder/piston unit is also used, carries the same disadvantages as those already mentioned. In this device, in fact, there are no guide rods in the vertical plane, so that in the course of conveyance, which is manually controlled by an operator, the jaw and the bundle in its grip are able to oscillate freely. In this case, too, conveyance speeds are low.

A jaw palletizer for conveying sheet bundles is also known from Italian patent no. 1,020,747, comprising two opposed cylinder/piston units, rod-shaped vertical elements serving as guides, and a vertical cylinder/piston unit whereby the jaw is attached to a trolley that moves on overhead rails. In palletizers of this type the cylinder/piston units are controlled independently, so that there can be no certainty that when the bundle is picked up the actions will be precisely opposed. These palletizers also have the disadvantage that bundles are liable to oscillate while being conveyed. The way they are designed also necessitates numerous components which raise their price considerably. In view of the weights, already referred to, of the jaws and the respective bundles, the jaw's cylinder/piston support is clearly incapable of speedily effecting vertical lifts of sufficient precision to ensure that the piles of bundles formed on the pallet are automatically compact.

Not only do all the known designs of jaw palletizers fail to pick up the bundle exactly in the center, they all share the disadvantage of not allowing for the rotation of the jaw in the horizontal plane.

With these known types of jaw, the bundles can therefore only be arranged on the pallets in a formation where they are parallel with one another, which means that really compact piles with "self-secured" bundles cannot be obtained, which is of course desirable.

SUMMARY OF THE INVENTION

Objects of the Invention

The object of the present invention is the creation of a palletizer of the type indicated that is capable of conveying the bundles at high speed, with precision, and without oscillation, and also of rotating the jaw in the horizontal plane.

An additional purpose of the present invention is the creation of a palletizer capable of assembling the piles on the pallets automatically and with precision, and more particularly in such a manner that the bundles provide physical support for one another, in an arrangement where they are parallel with and at right angles to one another, so that the piles obtained are both compact and also comprise bundles that are "self-secured" or not likely to become disassembled through the motions of travel.

A further purpose of the invention is the presentation of a palletizer capable of handling bundles of widely diverse lengths with the use of cylinder/piston units of very modest length, or requiring a limited volume of space in assembly.

Another purpose of the present invention is to be seen in the provision of a simple, modular design system for the jaw wherein this component can be transformed, time after time, from a plain jaw, in other words from one that is used merely for gripping and conveying the bundles, into one enabling the bundles to be rotated along their longitudinal axis, or gripping axis, and/or subsequently into a jaw which can be slewed in its horizontal plane. Yet another important purpose is the provision of a motion of the gripping cheeks for the bundles whereby mechanical restraint is exercised in relation to both of them, thus ensuring not only that their movement is synchronized but also that the picking up of the bundles is always centered in relation to the axis of rotation of the jaw, an indispensable prerequisite if their subsequent rotation is to be properly symmetrical. In this way the proposed jaw is made self-centering.

The object behind the present invention and the purposes that it can fulfill are achieved with a jaw palletizer in accordance with the invention, which is distinguished by the special features to be found in the claims.

Numerous advantages are obtained with the jaw palletizer being proposed.

In the first place it is of stable and compact design, so that the jaw in accordance with the invention can be installed in a comparatively small space. The jaw that is proposed also has the advantage of being of a modular or expanding type, in that from one for basic operation only, allowing merely for the gripping and conveyance of the bundles, it can be be readily transformed into a jaw capable of rotating the bundles and, subsequently or alternatively, into a jaw that is slewable in its horizontal plane. In this last case there is the advantageous option available either of assembling piles of stacks on the pallets, with the bundles arranged as desired, for instance with the layers of bundles arranged in a criss-cross pattern, or of depositing the bundles alongside the exit line of the pick-up station for the bundles or in a position at right angles to it. This has the advantage of allowing for selection of the area for setting down the bundles according to whichever is the most suitable at a particular time, according to whether, for example, there are columns or other obstructions close to the place where the stacker is installed, and so on. Rotation of the bundles along their longitudinal axis, through 90° or 180°, enables them to be loaded on the pallet with the back facing upwards, as is often required, irrespective of the position in which they arrive from the stacker. The use of encoders, preferably programmable by means of a keyboard, and the relevant pulse-counters, has the advantage of permitting the various travels in a horizontal direction of the jaw-holding trolley to be predetermined with great precision, and the same applies for the column supporting and displacing the jaw in the vertical direction, enabling the bundles to be picked up and moved with perfect precision and ensuring automatic assembly of piles of bundles, in a criss-cross pattern if desired, on the pallet. Automatic loading of the bundles in such a way that they are in close physical contact with one another, and arranged parallel to or at right angles to one another, is advantageously ensured mechanically through the effect of the impact of one bundle against the other, imparting optimum stability to the pile on the pallet and preventing any possible disarrangement through the motion of the pallet without its having to be first cellophane-wrapped or secured, as it normally is for short journeys in the printing works or the like.

BRIEF DESCRIPTION OF THE DRAWINGS

Further characteristics, advantages and details of the palletizer according to the invention are to be found in the description given below, in which reference is made to the attached drawings, illustrating one preferred embodiment thereof and a preferred variation, which are presented as an example. The following is a list of the drawings and what they illustrate in diagram form:

FIG. 1: view in lateral elevation of a jaw palletizer according to the invention;

FIG. 2: frontal view of the same, on the pallet side;

FIG. 3: horizontal section of trolley on which the jaw is mounted, following line III—III in FIG. 2;

FIG. 4: vertical section of trolley on which the jaw is mounted, following line of section IV—IV in FIG. 3;

FIG. 5: vertical section of trolley on which the jaw is mounted, following section V—V in FIG. 3;

FIG. 6: view of the jaw from above;

FIG. 7: lateral view of same;

DETAILED DESCRIPTION OF THE PREFERRED EMBODIMENTS

Figure 5A:
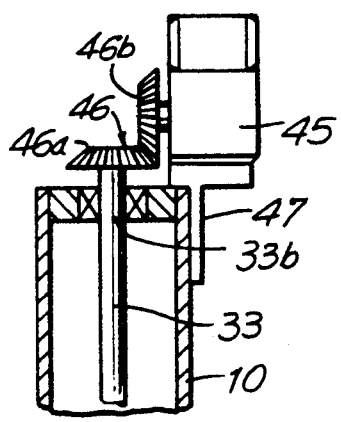
FIG. 5a: detail in cross-section of the top end of the column on which the jaw is mounted.
Figure 8:
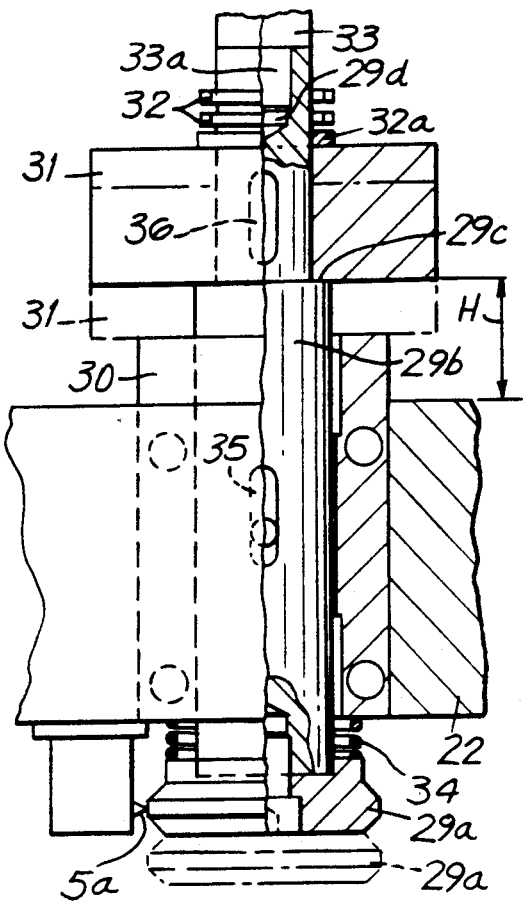
FIG. 8: detail showing central support pin of the jaw, more precisely half a view and half a cross-section.
Figure 9:
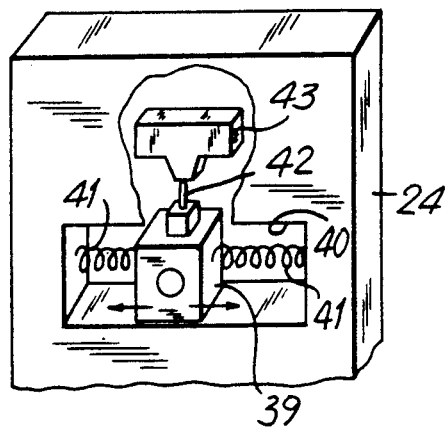
FIG. 9: detail of slide support of discs carrying the bundles.

In these different figures, for which differing scales have been used for greater clarity, and in which identical parts are denoted by the same reference numerals, the palletizer according to the invention is given the reference numeral 1 when depicted as an ensemble. It comprises essentially a support frame 2 supporting runways 3 at the top, of a kind that are per se known. The numeral 4 denotes the trolley that moves along said runways 3 and supports a jaw or jaw assembly denoted by 5. The bundles are denoted by 6, whilst 7 denotes the delivery, or collection, table for the same. The pallet on which the bundles are required to be set down to form a pile is denoted by 8, the pile being denoted by 9.

According to the invention, a single column 10 is provided to enable the jaw 5 to be raised in the vertical plane and to ensure stable guidance for same in said vertical plane. On two opposed sides the said column displays a guide section 11 with two opposed surface guides 11a, on which there run guide wheels 12 supported on the trolley 4. The V-shaped arrangement of the surface guides 11a, or the guide wheels 12, provides optimum stability for the movement of the column 10 in the vertical plane. These movements are effected, in accordance with the invention, by means of a rack 13 which is of one piece with the column 10. A pinion 14 engages with the rack 13, the former being splined to the output shaft 15 of a geared motor 16 supported on the trolley 4. The latter also supports another geared motor 17 for moving the trolley along the runways.

According to the invention, said runways 3 are likewise equipped with a rack 18 which is engaged by a pinion 19 supported at the end of a shaft 20 actuated by said geared motor 17. On one of the runways 3, or on one side of the trolley 4, the latter exhibits at its ends a slide wheel 21. The other runway 3 is designed with a section 11 with opposed surface guides 11a in the shape of a V, wherein guide wheels 12 engage in the same manner as that referred to above regarding the column 10. With this arrangement a movement of the trolley is obtained that is both extremely stable and very rapid.

The jaw 5 according to the invention comprises an upper transverse part formed essentially of two opposed plate-shaped side pieces 22 supporting the cylinder/piston units 23 operating the grips or gripping cheeks 24, referred to further below. On the outside, the side pieces 22 exhibit tubular elements serving as guides 25 for the lateral support rods 26 of the cheeks 24. This arrangement can be clearly seen in FIG. 6. So that relatively short cylinder/piston units 23 can be used, in accordance with the invention the side pieces 22 are provided with series of holes 27, in such a manner that positioning of the securing screws 27a of the cylinder/piston units 23 in said holes 27 is effected in accordance with the lengths of the bundles 6 to be conveyed. In this way the opening stroke of the piston rods 28 of said units 23 only needs to be of sufficient length to ensure that the jaw is lowered onto the bundle in a sufficiently reliable manner. Such strokes can be kept, for example, to within the order of 20 cm.

According to the invention, support for the jaw 5 is effected in such a way that it is the jaw itself that determines the point of arrest of its downward movement. To this end, in the central part of the jaw 5, support is provided for in the form of a slide coupling between a support pin 29 and a support block 30 fitted between the side pieces 22. The support pin 29 exhibits a lower end section shaped like a disc 29a operating in conjunction with a microswitch 5a fitted on the jaw 5. The upper part 29b of the pin 29 projects above the block 30 to a height H, approximately 10 mm, for example, and exhibits a depression should 29c on which it supports a plate 31 connecting with the column 10, such support being effected by means of two opposed plates 31a and screws 31b, as illustrated in FIG. 7. The end 29b of the pin 29 projects beyond the plate 31 and is affixed to the same by ring nuts 32 and a thrust bearing 32a. Said end 29b also exhibits an axial seating 29d, quadrangular or hexagonal, for example, for housing a bar hold 33a, suitably profiled, of a shaft 33 for rotating the jaw, described further below. The numeral 34 denotes a spring or rather a set of cup springs acting as a shock-absorber. The numerals 35 and 36 denote two keys, the first placed between the pin 29 and the support block 30 and the other placed between said pin 29 and the connecting plate 31. This prevents any relative rotation between the column 10 and the jaw 5. The latter can accordingly only effect linear conveyance of the bundles. This jaw is the basic jaw for the palletizer according to the invention. It is fitted with discs 37 for gripping the bundle. According to the invention, the support pins 38 of the discs 37 are supported in the gripping cheeks 24 in such a way that limited movement and self-positioning is permitted, by means, for example, of a movable slide 39 in a seating 40 opposed to repositioning springs 41 or similar. On their outside these slides support a microswitch 42, which operates in conjunction with a profiled plate 43 to signal displacement of the said discs, or of the bundle 6 being gripped, from their centered position. This occurs when a bundle 6 comes to rest against another bundle already on the pallet 8. Such springs can advantageously be calibrated and set from the outside.

According to the invention, the basic jaw described above can be transformed into a jaw allowing for rotation of the gripped bundle 6 along its longitudinal axis through the connecting up of a pin 38 of a disc 37 to a geared motor 44 mounted on a connected up slide 39. The springs 41 can of course be replaced by a hydraulic circuit, ensuring a high degree of reliability as regards repositioning of the slides 39. Such a circuit is not denoted here, since it can undoubtedly be installed by one skilled in this art.

Furthermore, according to the invention, the jaw that is proposed can be further transformed, or added to, to render it capable of rotating on itself in the horizontal plane. For this purpose, the column 10 is provided in hollow form, with a rotating shaft 33 running through it of which the bar hold 33a engages, as referred to above, in the seating 29d of the support pin 29 of the jaw, whilst the upper end 33b of the through shaft 33 is connected to a geared motor 45, by means, for example, of a pair 46 of bevel gears 46a, 46b splined to the rotating shaft of the geared motor 45. The latter is supported by a rest 47 on the upper end of the column 10. Each transformation of the jaw 5 can take place at any time without the need for any previous modification or adjustment of the jaw 5 itself or the column 10 or any other parts of the palletizer 1.

The runs made by the trolley 4 in the longitudinal direction to set down the bundles next to one another in the different layers provided for in the pile 9, as well as the vertical travels of the jaw 5, or of the column 10, to form the different layers of the pile 9, are advantageously effected by the use of encoder devices with pulse counters, that are known per se, which can be programmed; they are not illustrated further here. Correct positioning of the bundle 6 in the jaw 5 takes place automatically, since after the cheeks have come to rest on the table 7 for collection of the bundle the following downward movement of the column 10 causes, with the jaw 5 closed, the lowering of the bottom profiled end 29a of the support pin 29, and this lowering movement immediately brings the microswitch 5a into operation. This movement can be effected within the range of the travel H referred to above, and in respect of which a shock-absorbing spring can be installed, not illustrated further. Halting the movement of the trolley 4 once physical contact has been made between the bundle 6 to be unloaded and the bundle 6 already on the pallet 8 is assured by the microswitches 42, which come into operation only after said impact has taken place. For transforming the basic jaw, or the jaw effecting rotation of the bundle, to the jaw where there is horizontal rotation of the jaw itself, the key 36 has to be removed, since this ensures that the support pin 29 and the connecting plate 31 are rigidly connected, in order to allow the said pin to rotate freely, with the jaw 5 underneath, together with the rotating shaft 33.

Reference will now be made to the variant of the jaw illustrated in FIGS. 12–16, consisting of a jaw with a facility for self-centering gripping of the bundle. In other words, the bundle is now exactly centered with respect to the axis of the column 10, or the axis of rotation of the jaw 5. This is achieved, according to the invention, through mechanical restraint of the movement of the cheeks 24 with the aid of racks 50 and 51 with an interposed pinion, as will be referred to below. In this instance, for purposes of technical convenience, the support pin 29, instead of being a through component, is housed in a support turret 53 mounted above the jaw 5, as can be seen from the drawing, which also houses the microswitch 5a in chamber 53a working in conjunction with the lower end 29a of the pin 29. The arrangement of the keys 36, 37 is likewise analogous (not illustrated further). The support pin 28 is affixed to the column 10 in the manner previously illustrated.

The turret 53 has a chamber 53b in which the column moves in a range h.

In this variant, the two cylinder/piston units 23 are supported axially side by side in the jaw 5 and their piston rod 28 is attached by an articulated joint at 28a to the connected cheek 24. These exhibit, in the example shown, a support plate 54 in telescope form with lateral slide bushes 55 sliding respectively on a guide rod 56 and affixed by a pin 57 in the heads 58 of the jaw (FIG. 15), and these in turn are firmly affixed to an upper frame 59 for the jaw supporting in the center said support turret 53. Up to this point the behavior of the two cylinder/piston units 23 is similar to that of the units 23 in the version illustrated earlier. If the bundle 6 appearing at the collection point is wrongly positioned with respect to the axis of the column 10, the cheek 24 first coming into contact with the bundle stops against it to give the other cheek time to extend its travel, so that the bundle is gripped and lifted in such a way that it is centered in relation to the axis of the support column 10, or to the center line of the jaw itself. This will of course be reflected in the way in which the bundle is subsequently handled, when, with rotation of the bundle, the assembled piles would be slightly irregular. This is avoided, according to the invention, by the provision of racks 50 and 51 each of which is affixed to a cheek 24 at 50a and 51a and in engagement with the pinion 52 supported idle on the pin 52a supported in the jaw structure. In the area of said pinion 52 the racks are movable in slide guides, denoted by 60. As can be seen from the drawing, the racks 50 and 51 operate in mutually opposite directions, so that should the position in which the bundle 6 presents itself be out of center with respect to the longitudinal axis of the column 10, the cheek executing the longer distance of travel will at the same time forcibly determine that the bundle 6 is displaced by the cheek that has previously completed the shorter distance of travel. The jaw 5 that is constructed in this way accordingly displays a self-centering function so far as collection of the bundle is concerned. Movement of the bundle is facilitated in that it is provided with a feed-in, or pick-up, table, 7, in the form of a roller conveyor comprising longitudinal rollers, so as to reduce friction between the bundle 6 and said feed-in table 7 to a minimum.

From the description of the construction and function of the different components of the palletizer according to the invention, it can be seen that it provides an effective solution in terms of the underlying object of the present invention, and enables the purposes and advantages mentioned in the introductory section to be implemented.

Figure 10:
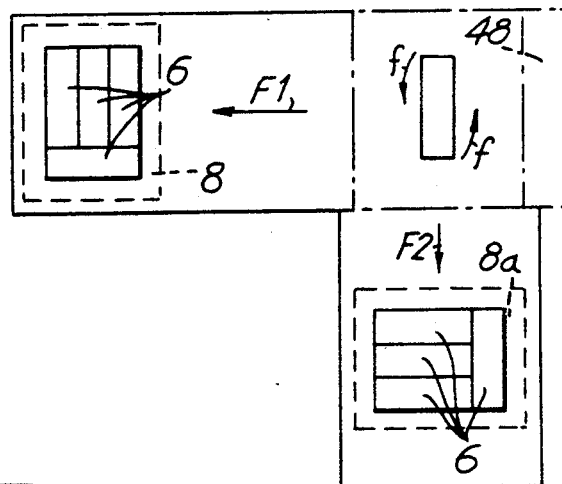
FIG. 10: diagram illustrating two possible methods of discharging bundles from the stacker with the palletizer according to the invention.
Figure 11:
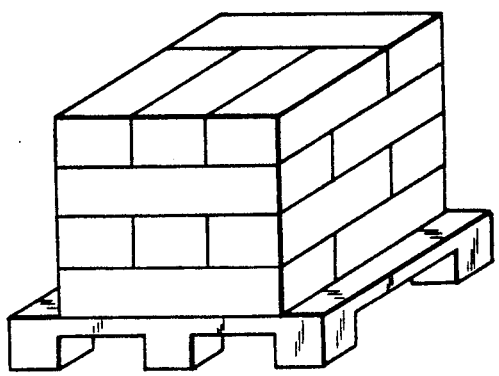
FIG. 11: view in perspective of a pile with criss-cross layers, which can be assembled by means of a jaw according to the invention.
Figure 12:
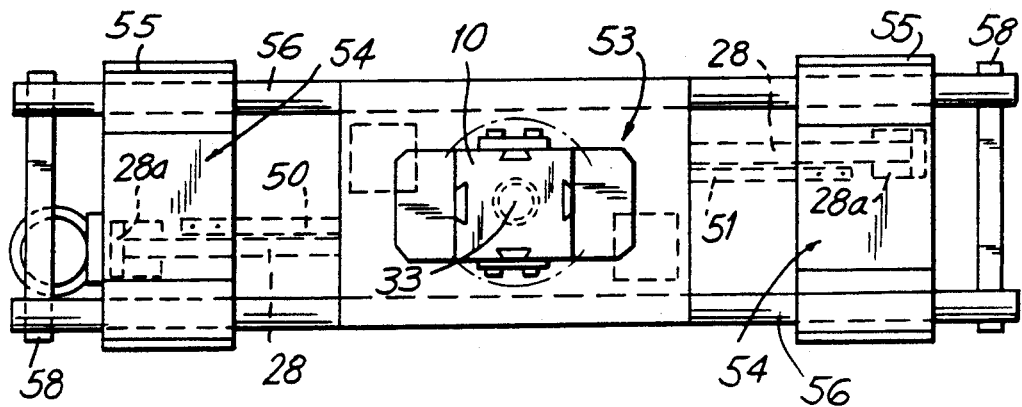
FIG. 12: view from above of a variant of the jaw, with self-centering operation.
Figure 13:
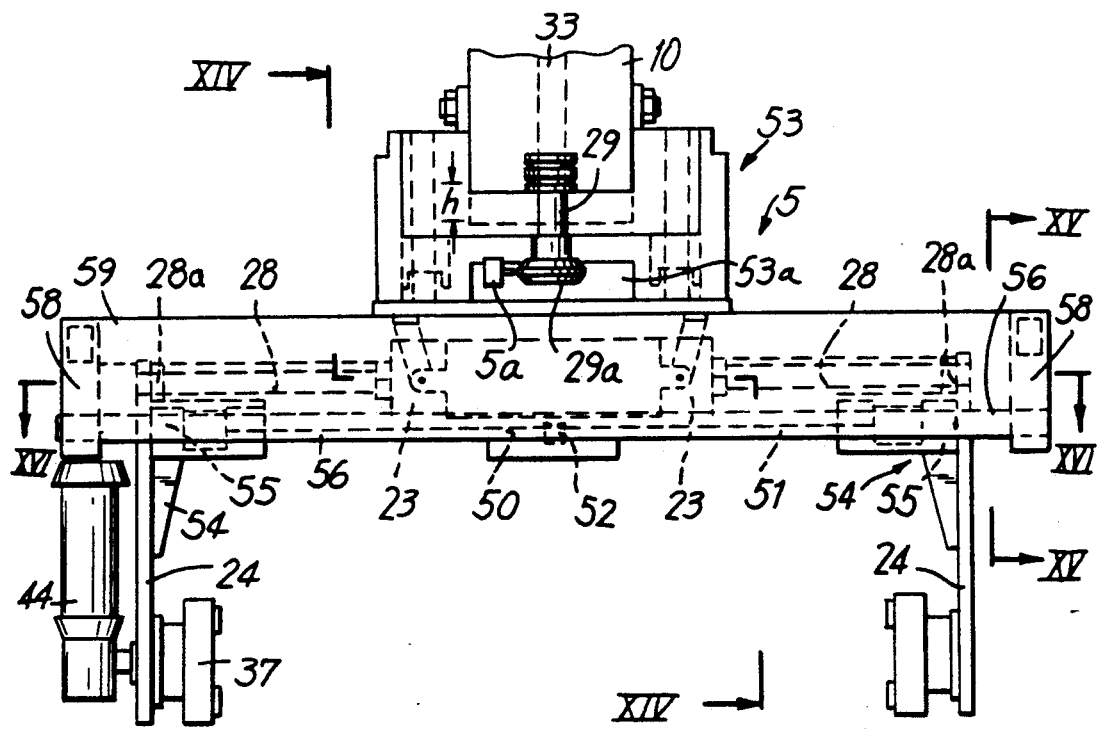
FIG. 13: a lateral component of the jaw shown in FIG. 12.
Figure 14:
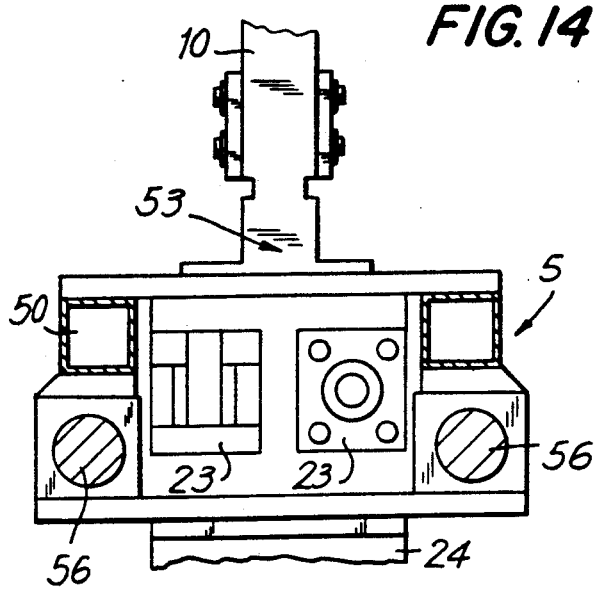
FIG. 14: section following line XIV—XIV in FIG. 13.
Figure 15:
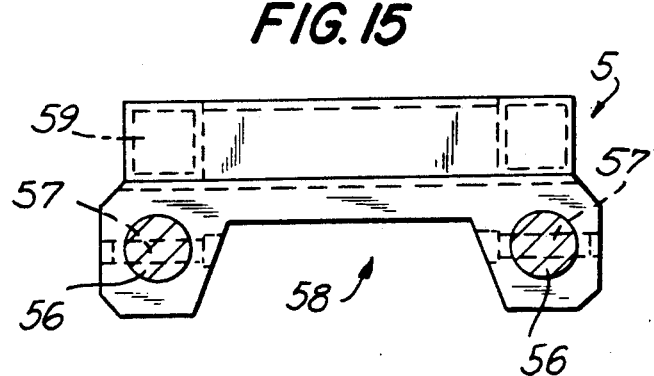
FIG. 15: section following line XV—XV in FIG. 13.
Figure 16:
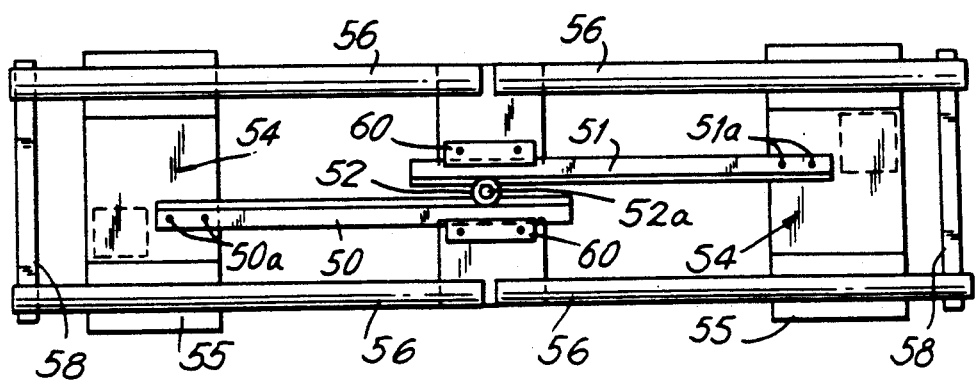
FIG. 16: section following line XVI—XVIA in FIG. 13

In practice, all the separate parts, or the separate components, can certainly be replaced by others that are equivalent from a technical and/or functional point of view, but this is no ground for discarding the range of protection in respect of the present invention. For instance, the support slides for the gripping discs for the bundles can be replaced by a plain slide coupling, in the case of a non-slewable jaw, and this coupling can be inserted in the jaw-holding column 10 slightly above the connecting plate 31. These slides will clearly be fitted with pre-loadable repositioning devices, designed either in the form of springs or as hydraulic circuit components. It can be seen from the diagram at FIG. 10 that the bundles 6 to be picked up from the table 7 downstream of the palletizer 48 can be arranged side by side on the pallet 8 with a movement in the direction of the arrow F1 or, after being rotated by the jaw in the direction of the arrow f and moved in the direction of the arrow F2, they can be loaded on the pallet 8a in an arrangement at right angles in relation to the pallet 8. On each of the pallets 8, 8a the bundles can additionally still be arranged in a parallel arrangement and also in an arrangement in criss-cross layers.

All the characteristics to be found in the description, claims and drawings are considered to be essential for the present invention, both singly and in any combination of them.

I claim:

1. An arrangement for loading elongated bundles of sheets on a pallet, comprising:
   (A) conveyor means for conveying a movable carriage between a supply station to which bundles are fed, and a loading station at which bundles are loaded on the pallet;
   (B) an upright column extending along a longitudinal axis and mounted on the carriage for joint movement therewith, said column also being mounted on the carriage for relative movement along the longitudinal axis;
   (C) a jaw assembly on the carriage, including
      (i) a pair of grips displaceable toward and away from each other along a transverse axis that extends perpendicularly of the longitudinal axis, and
      (ii) means for displacing the grips toward each other to a bundle-gripping position in which the grips engage opposite ends of a bundle, and away from each other to a bundle-release position in which the grips are disengaged from the bundle, said displacing means including
         (a) a pair of side pieces spaced apart of each other,
         (b) a pair of cylinder/piston units mounted between the side pieces, said units having colinearly-arranged arranged piston rods having outer ends operatively connected to the grips, wherein each grip has cavity in which a slide is mounted,
         (c) biasing means for positioning the slide in a central position within the cavity, and
         (d) means for sensing when the slide is positioned away from the central position;
   (D) a first drive for raising and lowering the column and the jaw assembly relative to the carriage along the longitudinal axis; and
   (E) a second drive for turning the grips in the bundle-gripping position about, and in a plane perpendicular to, the longitudinal axis to a desired angular orientation prior to loading the bundle onto the pallet.

2. The arrangement according to claim 1, wherein the conveyor means includes a pair of linear rails extending in mutual parallelism along the transverse axis, and wherein the carriage is mounted on the rails for rolling movement therealong, and wherein the conveyor means includes a motor for driving the carriage along the rails.

3. The arrangement according to claim 1; and further comprising means on said jaw assembly for rotating a gripped bundle about, and in a plane perpendicular to, the transverse axis.

4. The arrangement according to claim 1, wherein the displacing means includes a support pin mounted for sliding and turning movement along and about respectively the longitudinal axis in a support block between the side pieces, and locking means for selectively preventing turning of the pin relative to the block about the longitudinal axis.

5. The arrangement according to claim 1, wherein the second drive is operative to turn selected bundles through an angle of 90° prior to loading on the pallet.

6. An arrangement for loading elongated bundles of sheets on a pallet, comprising:
   (A) conveyor means for conveying a movable carriage between a supply station to which bundles are fed, and a loading station at which bundles are loaded on the pallet;
   (B) an upright column extending along a longitudinal axis and mounted on the carriage for joint movement therewith, said column also being mounted on the carriage for relative movement along the longitudinal axis,
   (C) a jaw assembly on the carriage, including
      (i) a pair of grips displaceable toward and away from each other along a transverse axis that extends perpendicularly of the longitudinal axis,
      (ii) means for displacing the grips toward each other to a bundle-gripping position in which the grips engage opposite ends of a bundle, and away from each other to a bundle-release position in which the grips are disengaged from the bundle, said displacing means including
         (a) a pair of said pieces spaced apart of each other,
         (b) a support block mounted between the side pieces, p3 (c) a pair of cylinder/piston units mounted between the side pieces, said units having colinearly-arranged piston rods having outer ends operatively connected to the grips,
         (d) a support pin mounted in the support block for sliding movement therein along the longitudinal axis and for turning movement therein about the longitudinal axis, and
         (e) locking means for selectively preventing turning of the pin relative to the block about the longitudinal axis;
   (D) a first drive for raising and lowering the column and the jaw assembly relative to the carriage along the longitudinal axis; and
   (E) a second drive for turning the grips in the bundle-gripping position about, and in a plane perpendicular to, the longitudinal axis to a desired angular orientation prior to loading the bundle onto the pallet.

7. The arrangement according to claim 6, wherein the grips have an internal cavity in which a slide is mounted, and further comprising biasing means for positioning the slide in a central position within the cavity, and means for sensing when the slide is positioned away from the central position.

8. The arrangement according to claim 6, wherein the pin has a sensor end, and wherein the displacing means includes means for detecting the position of the sensor end, including an electrical switch having an armature engageable with the sensor end.

9. The arrangement according to claim 8, wherein the column is hollow; and wherein the second drive includes a shaft extending through the hollow column and connected to an end of the pin, and a motor coupled to the shaft for turning the same about the longitudinal axis.

10. An arrangement for loading elongated bundles of sheets on a pallet, comprising:
   (A) conveyor means for conveying a movable carriage between a supply station to which bundles are fed, and a loading station at which bundles are loaded on the pallet;
   (B) an upright column extending along a longitudinal axis and mounted on the carriage for joint movement therewith, said column also being mounted on the carriage for relative movement along the longitudinal axis;
   (C) a jaw assembly on the carriage, including
      (i) a pair of grips displaceable toward and away from each other along a transverse axis that extends perpendicularly of the longitudinal axis,
      (ii) means for displacing the grips toward each other to a bundle-gripping position in which the grips engage opposite ends of a bundle, and away from each other to a bundle-release position in which the grips are disengaged from the bundle, said displacing means including
         (a) a pair of cylinder/piston units mounted in a side-by-side relationship and having piston rods arranged in mutual parallelism, each rod having an outer end operatively connected to a respective grip,
         (b) self-centering means for centrally positioning a bundle between the grips,
         (c) a hollow support turret surrounding the column, and
         (d) a support pin mounted in the support turret for sliding movement therein along the longitudinal axis and for turning movement therein about the longitudinal axis;
   (D) a first drive for raising and lowering the column and the jaw assembly relative to the carriage along the longitudinal axis; and
   (E) a second drive for turning the support pin and thereby causing the grips in the bundle-gripping position to turn about, and in a plane perpendicular to, the longitudinal axis to a desired angular orientation prior to loading the bundle onto the pallet.

11. The arrangement according to claim 10, wherein the pin has a sensor end, and wherein the displacing means includes means for detecting the position of the sensor end, including an electrical switch having an armature engageable with the sensor end.

* * * * *